United States Patent
Chang (10) Patent No.: US 9,822,464 B2
(45) Date of Patent: Nov. 21, 2017

(54) ELECTROCHEMICAL MACHINING APPARATUS

(71) Applicant: HON HAI PRECISION INDUSTRY CO., LTD., New Taipei (TW)

(72) Inventor: Shao-Han Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 526 days.

(21) Appl. No.: 14/517,293

(22) Filed: Oct. 17, 2014

(65) Prior Publication Data

US 2015/0122634 A1 May 7, 2015

(30) Foreign Application Priority Data

Nov. 6, 2013 (CN) .......................... 2013 1 0543787

(51) Int. Cl.
C25F 7/00 (2006.01)
B23H 3/04 (2006.01)
B23H 3/10 (2006.01)
B23H 7/30 (2006.01)

(52) U.S. Cl.
CPC ................ *C25F 7/00* (2013.01); *B23H 3/04* (2013.01); *B23H 3/10* (2013.01); *B23H 7/30* (2013.01)

(58) Field of Classification Search
CPC .... C25F 7/00; C23H 3/04; C23H 3/10; C23H 7/30
See application file for complete search history.

(56) References Cited

U.S. PATENT DOCUMENTS 3,271,281 A * 9/1966 Brown ..................... B23H 3/04
 204/224 M
6,833,524 B2 12/2004 Krenz

FOREIGN PATENT DOCUMENTS

TW 200415262 A 8/2004
TW 201141639 A 12/2011

\* cited by examiner

*Primary Examiner* — Ciel Thomas
(74) *Attorney, Agent, or Firm* — ScienBiziP, P.C.

(57) ABSTRACT

An electrochemical machining apparatus includes a fastening bracket, a first drive member positioned on the fastening bracket, a connecting member, a first electrode connected to the connecting member, a second driving member, a second electrode connected to the second driving member, a moving assembly positioned on the fastening bracket, an electrolytic cell positioned on moving assembly, a pump, and a vacuum pump. The first electrode defines a plurality of liquid collecting grooves spaced from each other. Each liquid collecting grooves defines a plurality of second through holes. At least one liquid collecting groove is connected to the pump, and the other liquid collecting grooves are connected to the vacuum pump. The portion of the second electrode can be inserted into and depart from the second through holes.

13 Claims, 7 Drawing Sheets

ELECTROCHEMICAL MACHINING APPARATUS

FIELD

The subject matter herein generally relates to an electrochemical machining apparatus.

BACKGROUND

Electrochemical machining (ECM) is a commonly used method of machining electrically conductive workpieces with one or more electrically conductive tooling electrodes. During the machining process, a tooling electrode is located near the workpiece defining a machining gap. The gap is filled with a pressurized, flowing, aqueous electrolyte, such as a sodium nitrate aqueous solution. A direct current electrical potential is established between the tool electrode and the workpiece to cause controlled depletion of the electrically conductive workpiece. The depletion action takes place in an electrolytic cell formed by the negatively charged electrode (cathode) and the positively charged workpiece (anode) separated by the flowing electrolyte. The depleted material is removed from the gap by the flowing electrolyte, which also removes heat formed by the chemical reaction.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an electrochemical machining apparatus.

Figure 1:
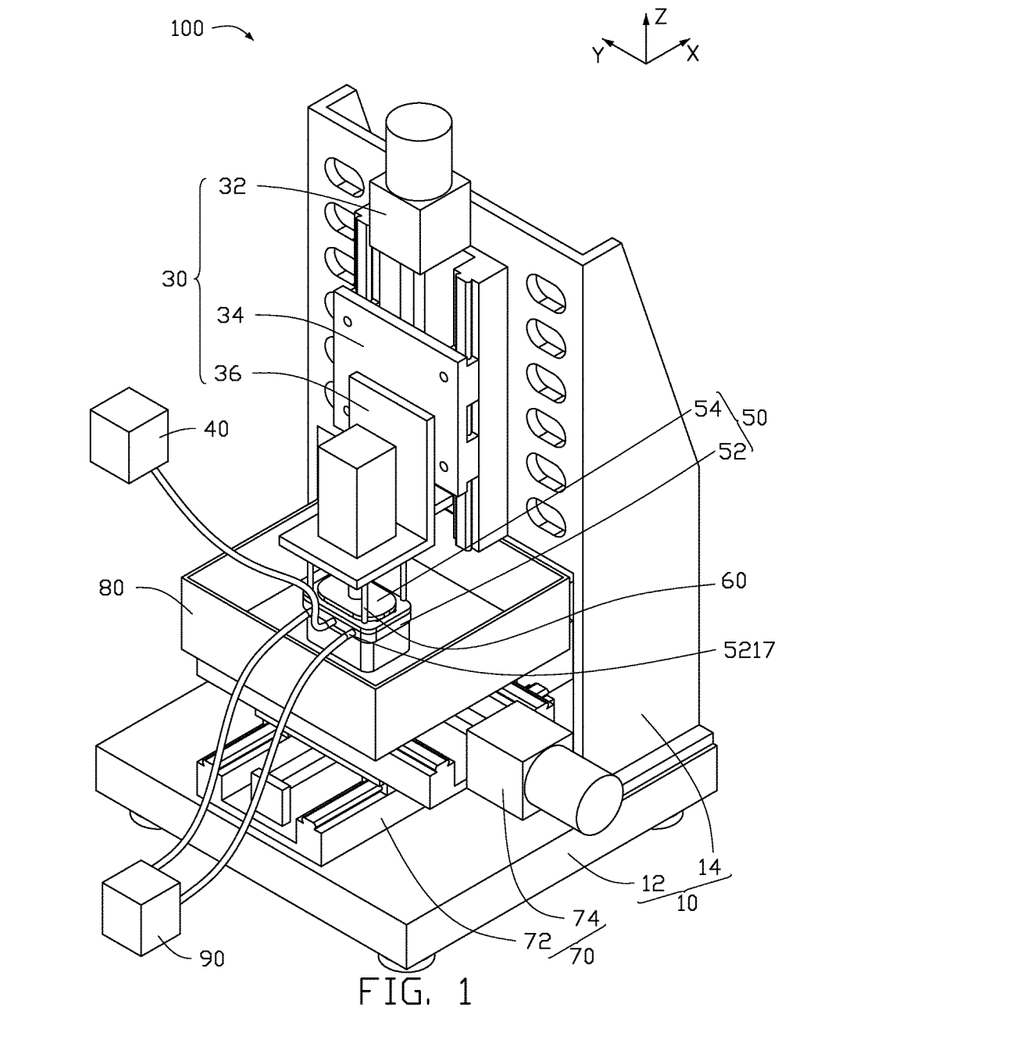
FIG. 1 is an isometric view of an embodiment of an electrochemical machining apparatus.
Figure 7:
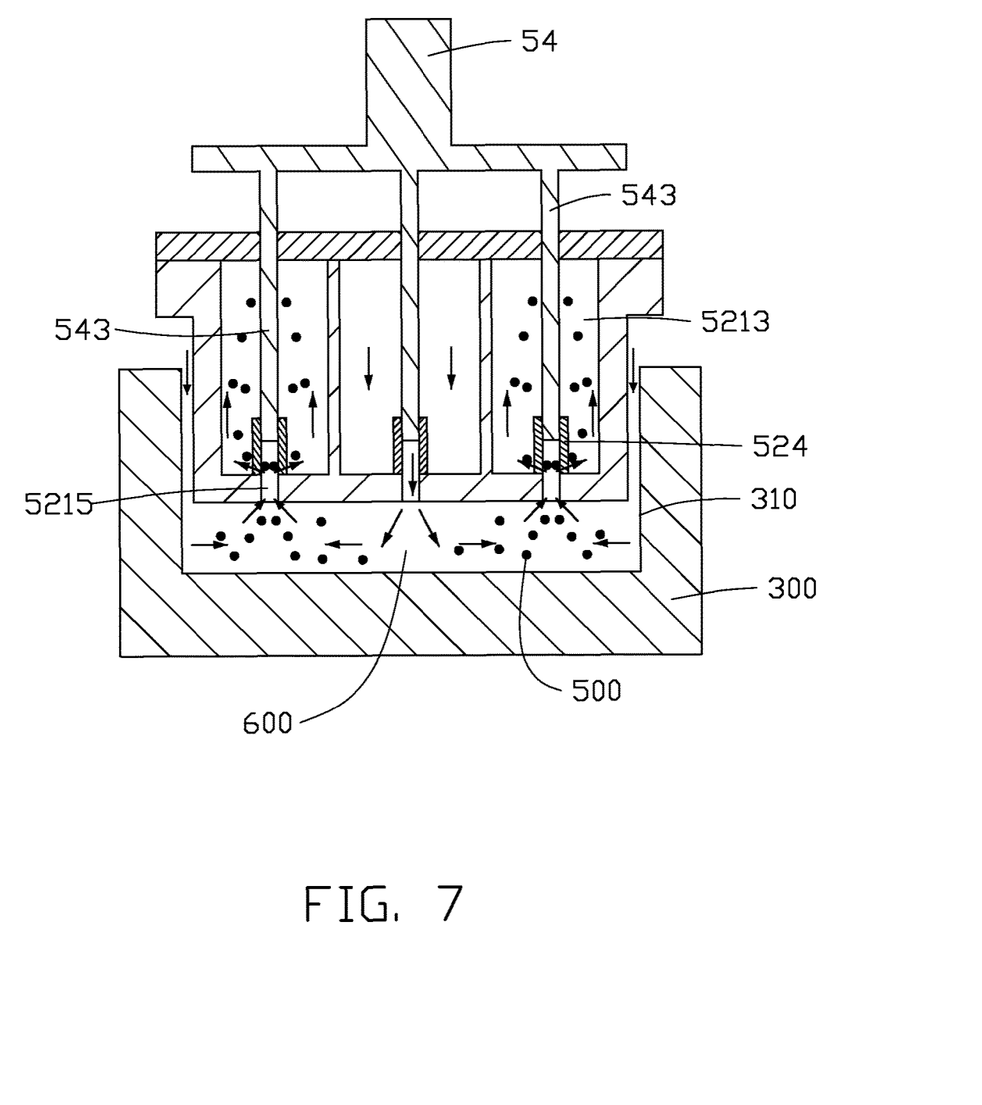
FIG. 7 is a partial, cross-sectional view of the electrochemical machining apparatus of FIG. 1 when processing.

FIG. 1 illustrates an embodiment of an electrochemical machining apparatus 100 configured to define a cavity 310 on a workpiece 300 (shown in FIG. 7). The electrochemical machining apparatus 100 can include a fastening bracket 10, a feed assembly 30 positioned on the fastening bracket 10, a pump 40, an electrode assembly 50 positioned on the feed assembly 30, a moving assembly 70 positioned on the fastening bracket 10, an electrolytic cell 80 positioned on the moving assembly 70 and a vacuum pump 90. The pump 40 and the vacuum pump 90 can be connected to the electrode assembly 50 adjacent to the fastening bracket 10.

The fastening bracket 10 can be substantially L-shaped, and can include a supporting portion 12 and an assembly portion 14. The assembly portion 14 can be positioned on the supporting portion 12.

The feed assembly 30 can be positioned on the assembly portion 14, and can include a first drive member 32, connecting member 34 positioned on the first drive member 32, and a second drive member 36 positioned on the connecting member 34. The connecting member 34 can be a substantially L-shaped plate. One end of the connecting member 34 can be positioned on the first drive member 32, the other end of the connecting member 34 can include a through hole (not labeled) configured to fasten the second drive member 36. The second member 32 can drive the connecting member 34 along the Z coordinate. The first drive member 32 and the second drive member 36 can be a direct current motor or any other suitable motor.

The electrode assembly 50 can include a first electrode 52 and a second electrode 54 received in the first electrode 52. The first electrode 52 can be a hollow block, and can be positioned on the connecting member 34 by a plurality of connecting columns 60 opposite to the second drive member 36. Thus, the second electrode 54 can be connected to the second drive member 36.

The first electrode 52 can define a plurality of openings 5217 positioned on the sidewall (not labeled) of the first electrode 52. The vacuum pump 90 can be connected to at least one opening 5217. The pump 40 can be connected the other openings 5217.

The moving assembly 70 can be positioned on the supporting member 12, and can include a first moving member 72 and a second moving member 74 slidable and positioned on the first moving member 72.

Figure 2:
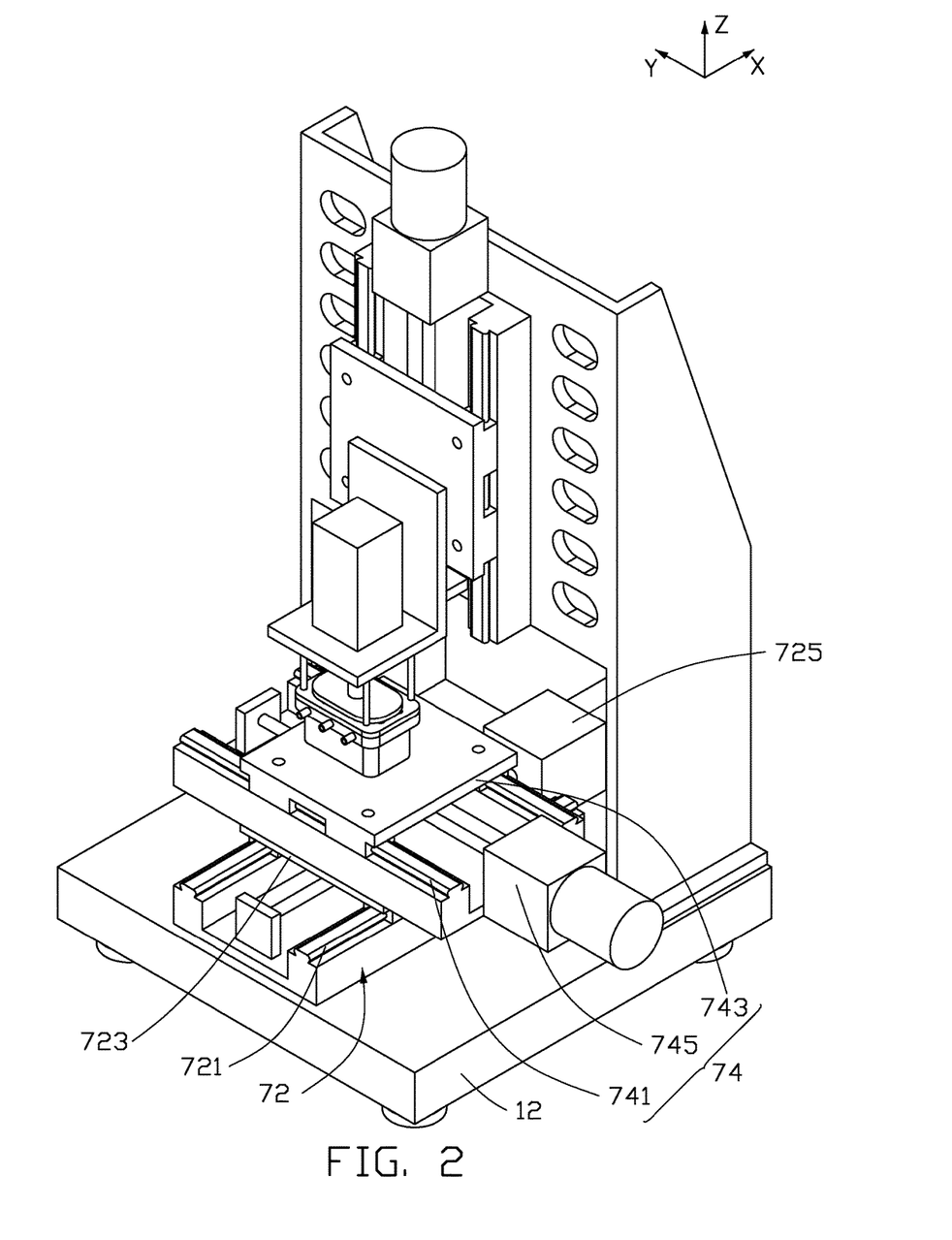
FIG. 2 is a partial, isometric view of the electrochemical machining apparatus of FIG. 1.

FIG. 2 illustrates that the first moving member 72 can include a first guide rail 721 fastened on the supporting portion 12 parallel to the X coordinate, a first sliding block 723 slidable and positioned on the first guide rail 721, and a first air drive cylinder 725 positioned on the supporting portion 12. The first sliding block 723 can be connected to the first air drive cylinder 725. The first air drive cylinder 725 can drive the first sliding block 723 along the first guide rail 721. The second moving member 74 can include a second guide rail 741 positioned on the first sliding block 723 parallel to the Y coordinate, a second sliding block 743 slidable and positioned on the second guide rail 741, and a second air drive cylinder 745 positioned on the second guide rail 741. The second air drive cylinder 745 can be connected to the second sliding block 743. The second air drive cylinder 745 can drive the second sliding block 743 along the second guide rail 741. The electrolytic cell 80 (shown in FIG. 1) can be a substantially rectangular groove to receive the workpiece 300 (shown in FIG. 7), and can be positioned on the second sliding block 743.

Figure 3:
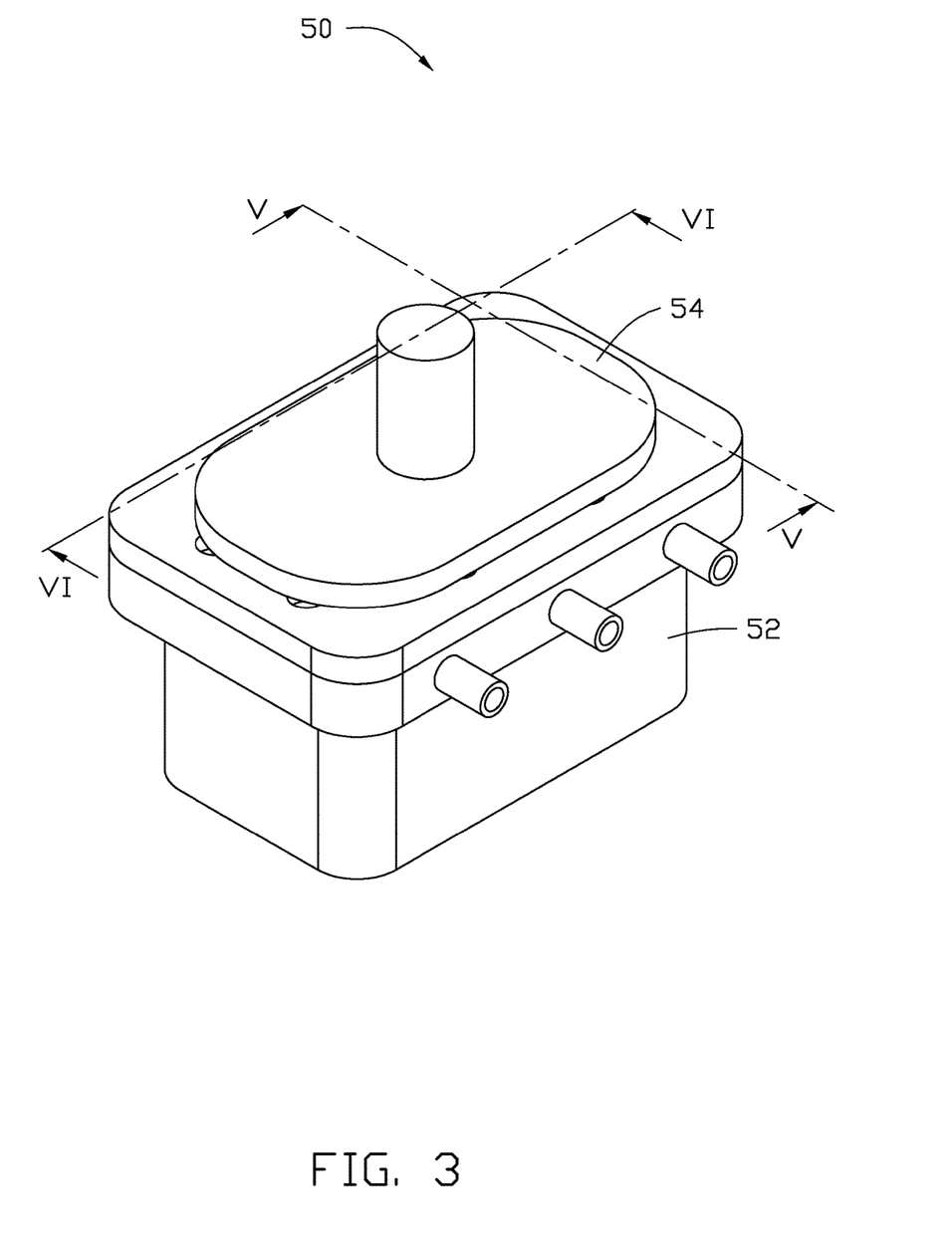
FIG. 3 is an isometric view of an electrode assembly of the electrochemical machining apparatus of FIG. 1.
Figure 4:
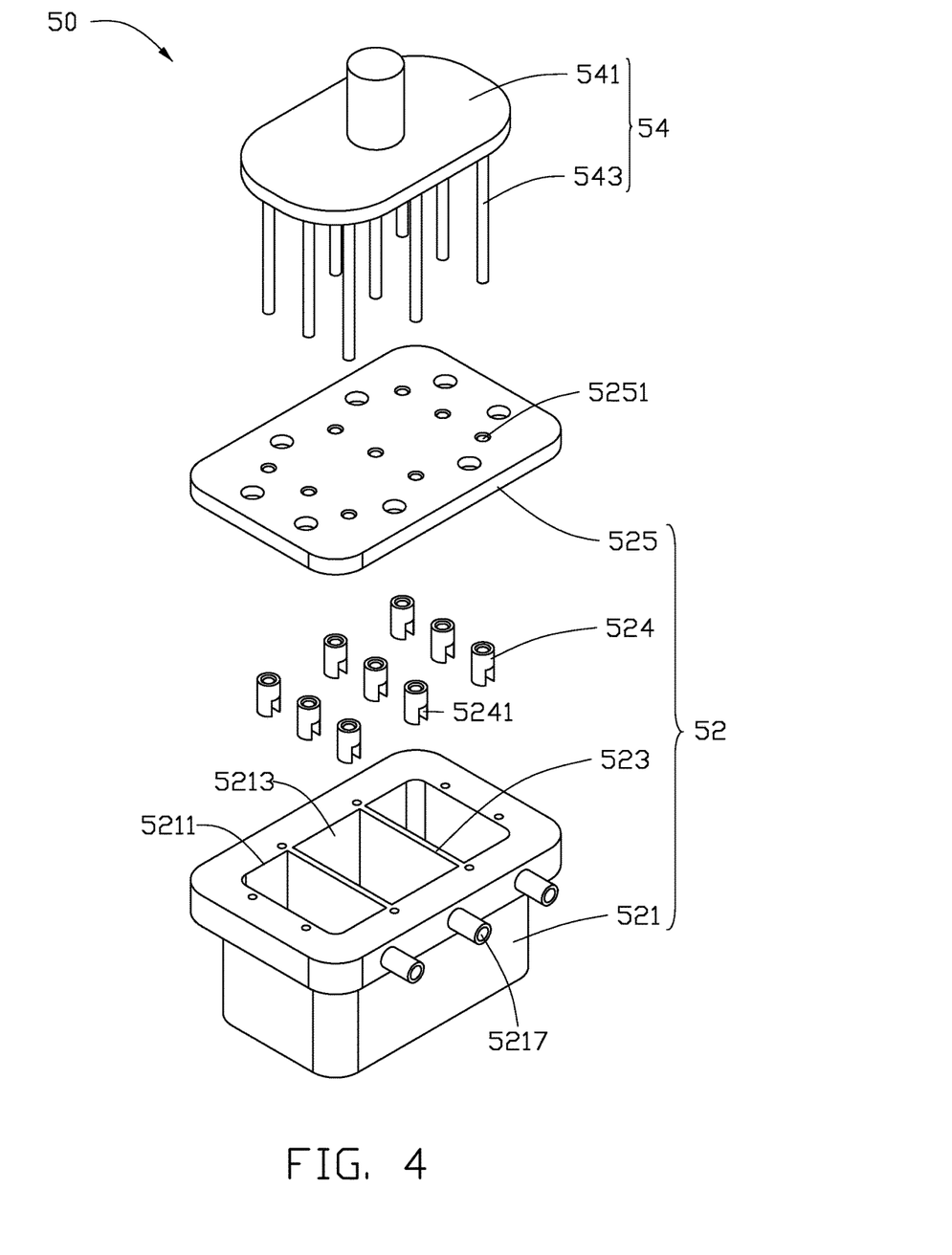
FIG. 4 is an exploded isometric view of the electrode assembly of the electrochemical machining apparatus of FIG. 1.

FIGS. 3 and 4 illustrate that the first electrode 52 can include a main body 521, a plurality of separating members 523 received in the main body 521, a plurality of guide sleeves 524, and a covering plate 525 covering the main body 521. The main body 521 can define a receiving groove 5211. The receiving groove 5211 can define a plurality of liquid collecting grooves 5213 defined by the separating members 523 spaced from each other in the receiving groove 5211. Each of the openings 5217 can correspond to and communicate with the one liquid collecting groove 5213. Each of the guide sleeves 524 can include an opening portion 5241 positioned on the one end of the guide sleeves 524. The covering plate 525 can include a plurality of rows of first through holes 5251. Each row of the first through holes 5251 can correspond to and communicate with the one liquid collecting groove 5213.

The second electrode 54 can be connected on the second drive member 36 (shown in FIG. 1) above the covering plate 525. The second drive member 36 (shown in FIG. 1) can drive the second electrode 54 along the Z coordinate. The second electrode 54 can include a fastening portion 541 and a plurality of rows of inserting portions 543 positioned on the fastening portion 541. Each row of the inserting portions 543 can correspond to and pass through one row of the first through holes 5251.

Figure 5:
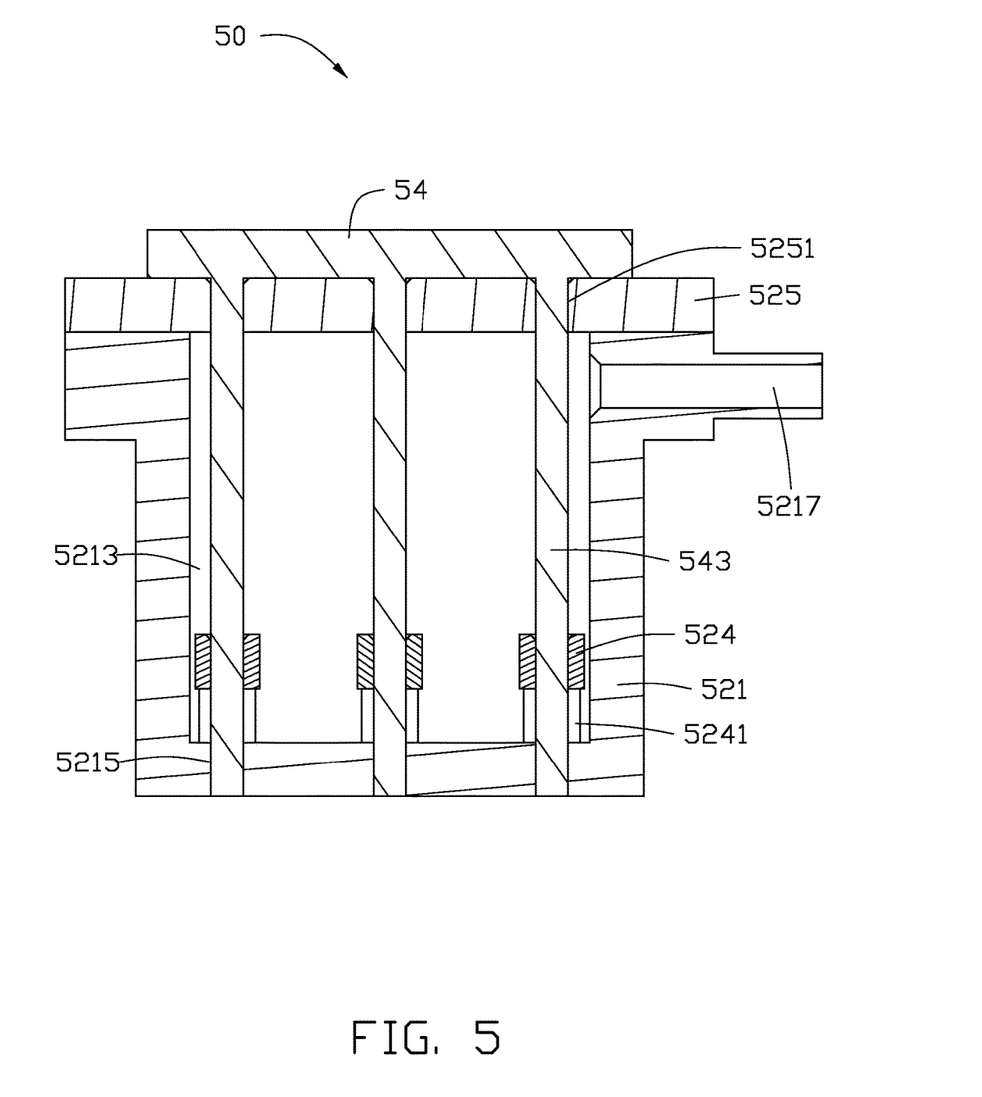
FIG. 5 is a cross-sectional view of the electrode assembly of FIG. 3, taken along line V-V.
Figure 6:
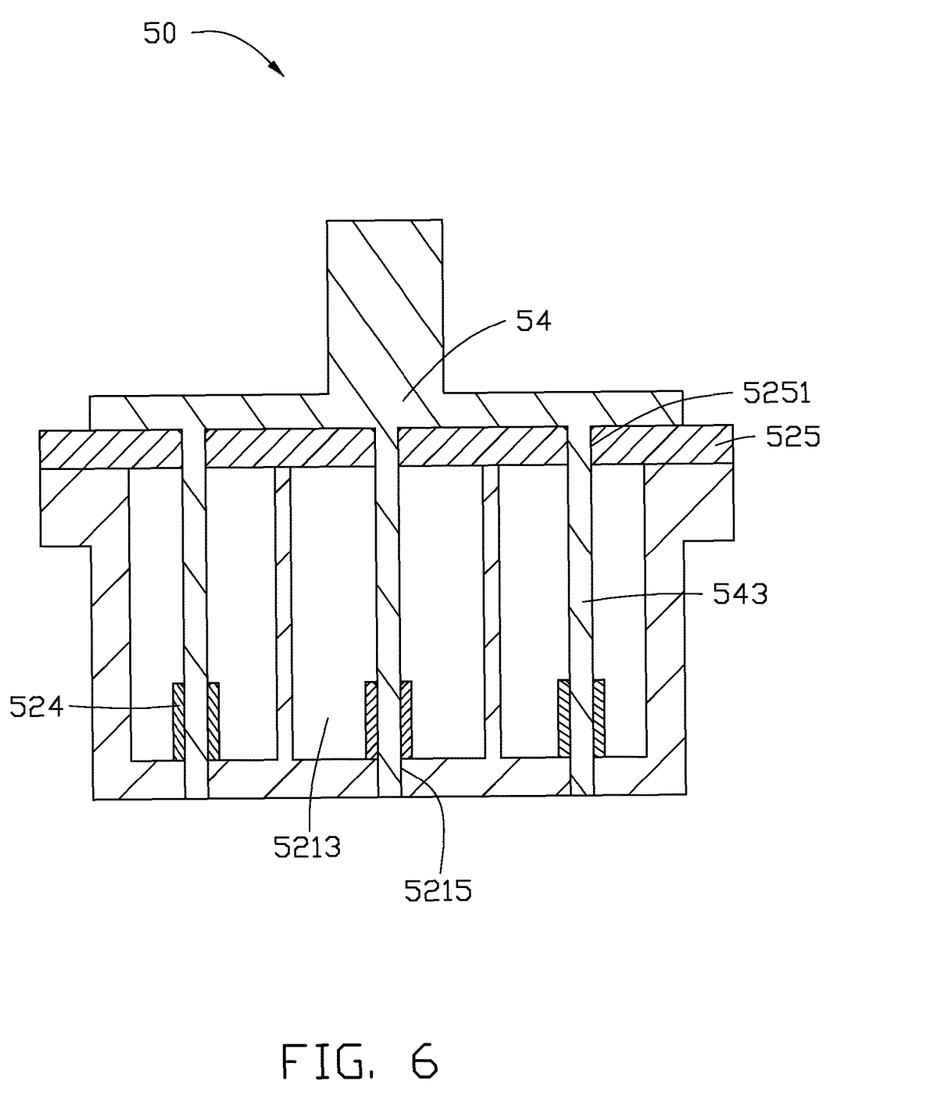
FIG. 6 is a cross-sectional view of the electrode assembly of FIG. 3, taken along line VI-VI.

FIGS. 5 and 6 illustrate that each of the liquid collecting grooves 5213 can define a row of second through holes 5215 spaced from each other on the bottom of the liquid collecting groove 5123. Each of the second through holes 5215 can be connected to one of the guide sleeves 524, and the opening portion 5241 can be adjacent to the second through hole 5215. The inserting portions 543 can pass through the corresponding the first through holes 5251, the guide sleeves 524 and the second through holes 5215 to seal the liquid collecting grooves 5213. The pump 40 (shown in FIG. 1) connected to the openings 5217 can provide the electrolyte to the liquid collecting grooves 5213. The vacuum pump 90 (shown in FIG. 1) can provide negative pressure and pump the electrolyte from the collecting grooves 5213. In the embodiment, the pump 40 (shown in FIG. 1) can be connected to the openings 5217 located at the center of the main body 521. The vacuum pump 90 (shown in FIG. 1) can be connected to the openings 5217 adjacent to the two sides of the main body 521.

FIG. 7 illustrates that the workpiece 300 with the deep cavity 301 is processed by the electrochemical machining apparatus 100 (shown in FIG. 1). In the process, the inserting portions 543 of the second electrode 54 can depart from the second through holes 5215. The electrolyte can gush into a machining gap 600 through the corresponding collecting grooves 5213, the opening portions 5241 (shown in FIG. 5), and the second through holes 5215 via the pump 40 (shown in FIG. 1). The electrolyte with the electrolysate 500 can flow into the corresponding collecting grooves 5213 through the second through holes 5215 and the opening portions 5241 (shown in FIG. 5) via the vacuum pump 90 (shown in FIG. 1).

In operation, the workpiece 300 can be fastened in the electrolytic cell 80. The first moving member 72 and the second moving member 74 can move the electrolytic cell 80 close to the first electrode 52 allowing the workpiece 300 to face the first electrode 52. The first drive member 32 can drive the electrode member 50 to the workpiece 300 for the starting process. The second drive member 36 can drive the second electrode 54 away from the workpiece 300, and the inserting portions 543 can depart from the second through holes 5215. Simultaneously, the electrolyte can gush into the machining gap 600 via the pump 40. The electrolysate 500 can depart from the workpiece 300 to merge with the electrolyte. The electrolyte with the electrolysate 500 can flow into the corresponding collecting grooves 5213 via the vacuum pump 90. The electrolyte in the machining gap 600 can be renewed, and the electrolysate 500 can be expelled out of the machining gap 600.

As described above, the plurality of the isolated liquid collecting grooves 5213 can be positioned in the first electrode 52. At least one liquid collecting grooves 5123 can be connected to the pump 40, and the other liquid collecting grooves 5123 can be connected to the vacuum pump 90. After the second electrode 54 departs from the second through holes 5215, the electrolyte can pass through the liquid collecting grooves 5213 and gush into the machining gap 600 forced by the pump 40. In addition, the electrolyte can be pumped into the corresponding liquid collecting grooves 5213 forced by the vacuum pump 90. The electrolyte in the machining gap 600 can be renewed, and the electrolysate 500 can be expelled out of the machining gap 600. The processing efficiency of the electrochemical machining apparatus 100 can be improved.

The main body 521 and the separating members 523 can also be unibody. The bottom of the liquid collecting grooves 5123 and the guide sleeves 524 can also be unibody.

The guide sleeves 524 can be removed, and the inserting portions 543 can directly pass through the second through holes 5215. The covering plate 525 can be removed, and the fastening portion 541 of the second electrode 54 can directly cover the main body 521.

The second moving member 74 can be also directly positioned on the supporting portion 12, and can drive the electrolytic cell 80 to move along the Y coordinate.

The embodiments shown and described above are only examples. Many details are often found in the art such as the other features of an electrochemical machining apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:
1. An electrochemical machining apparatus comprising:
a fastening bracket;
a feed assembly positioned on the fastening bracket, the feed assembly comprising a first drive member, a connecting member, and a second drive member positioned on the connecting member;

an electrode assembly comprising a first electrode positioned on the connecting member and a second electrode connected to the second drive member;

a pump adjacent to the fastening bracket;

a moving assembly positioned on the fastening bracket;

an electrolytic cell positioned on the moving assembly; and a vacuum pump adjacent to the fastening bracket;

wherein the first electrode defines a plurality of isolated liquid collecting grooves, at least one liquid collecting groove of the plurality of isolated liquid collecting grooves connected to the pump, and all other liquid collecting grooves of the plurality of isolated liquid collecting grooves connected to the vacuum pump, each of the plurality of liquid collecting grooves defining a plurality of second through holes, the second electrode received by the first electrode and inserted into the plurality of second through holes, the second drive member driving the second electrode, resulting in withdrawal of the second electrode from the plurality of second through holes, the pump providing electrolyte into the liquid collecting grooves that the pump is connected to, the vacuum pump providing negative pressure to pump the electrolyte from the liquid collecting grooves that the vacuum pump is connected to.

2. The electrochemical machining apparatus as claimed in claim 1, wherein the first electrode further includes a main body and a plurality of separating members, the main body defines a receiving groove.

3. The electrochemical machining apparatus as claimed in claim 2, wherein the plurality of separating members are spaced from each other in the receiving groove to form the plurality of isolated liquid collecting grooves.

4. The electrochemical machining apparatus as claimed in claim 2, wherein the first electrode further includes a covering plate covering the receiving groove, the covering plate defines a plurality of first through holes corresponding to the plurality of second through holes.

5. The electrochemical machining apparatus as claimed in claim 4, wherein the second electrode includes a fastening portion and a plurality of inserting portions positioned on the fastening portion, the fastening portion is connected to the second drive member.

6. The electrochemical machining apparatus as claimed in claim 4, wherein the first electrode further includes a plurality of guide sleeves positioned on the bottom of the liquid collecting grooves, each of the plurality of guide sleeves is connected to one second through hole of the plurality of second through holes to guide the inserting portion.

7. The electrochemical machining apparatus as claimed in claim 5, wherein the plurality of inserting portions passes through the plurality of first through holes and is inserted into the plurality of second through holes.

8. The electrochemical machining apparatus as claimed in claim 6, wherein each of the plurality of guide sleeves defines an opening portion, the opening portion is adjacent to a corresponding second through hole of the plurality of second through holes.

9. The electrochemical machining apparatus as claimed in claim 1, wherein the moving assembly includes a first moving member and a second moving member slidable and positioned on the first moving member, the electrolytic cell is positioned on the second moving member.

10. The electrochemical machining apparatus as claimed in claim 9, wherein the first moving member includes a first guide rail fastened on the fastening bracket, a first sliding block slidable and positioned on the first guide rail, and a first air drive cylinder positioned on the fastening bracket, the first air drive cylinder is connected to the first sliding block; the second moving member is positioned on the first sliding block.

11. The electrochemical machining apparatus as claimed in claim 9, wherein the second moving member includes a second guide rail positioned on the first sliding block, a second sliding block slidable and positioned on the second guide rail, and a second air drive cylinder positioned on the second guide rail, the second air drive cylinder is connected to the second sliding block.

12. The electrochemical machining apparatus as claimed in claim 1, wherein the first electrode defines a plurality of openings positioned on a sidewall of the first electrode, at least one opening of the plurality of openings are connected to the pump, and all other openings of the plurality of openings that are not connected to the pump are connected to the vacuum pump.

13. The electrochemical machining apparatus as claimed in claim 12, wherein the plurality of openings is positioned on an end of the first electrode away from the second through holes.

* * * * *